(12) United States Patent
Suzuki

(10) Patent No.: US 11,098,181 B2
(45) Date of Patent: Aug. 24, 2021

(54) SIDE-REINFORCING RUBBER FOR RUN-FLAT TIRE AND RUN-FLAT TIRE

(71) Applicant: BRIDGESTONE CORPORATION, Tokyo (JP)

(72) Inventor: Eiju Suzuki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 16/706,938

(22) Filed: Dec. 9, 2019

(65) Prior Publication Data

US 2020/0109268 A1    Apr. 9, 2020

Related U.S. Application Data

(63) Continuation of application No. PCT/JP2018/022047, filed on Jun. 8, 2018.

(30) Foreign Application Priority Data

Jun. 16, 2017    (JP) .............................. JP2017-119063

(51) Int. Cl.
*C08L 7/00*        (2006.01)
*B60C 1/00*        (2006.01)
*C08K 3/04*        (2006.01)

(52) U.S. Cl.
CPC ................. *C08L 7/00* (2013.01); *B60C 1/00* (2013.01); *B60C 2001/0033* (2013.01); *C08L 2205/03* (2013.01); *C08L 2312/00* (2013.01)

(58) Field of Classification Search
None
See application file for complete search history.

(56) References Cited

U.S. PATENT DOCUMENTS 7,163,975 B2 *   1/2007  Zanzig ...................... B60C 1/00
                                                             524/47
2004/0050472 A1 *  3/2004  Carter ..................... B60C 17/04
                                                             152/521

(Continued)

FOREIGN PATENT DOCUMENTS

EP            3725839 A1      10/2020
JP         2000-301910 A      10/2000

(Continued)

OTHER PUBLICATIONS

International Search Report for PCT/JP2018/022047 dated Sep. 4, 2018. [PCT/ISA/210].

(Continued)

*Primary Examiner* — Tae H Yoon
(74) *Attorney, Agent, or Firm* — Sughrue Mion, PLLC

(57) ABSTRACT

The side-reinforcing rubber for run-flat tires of the present invention is a side-reinforcing rubber for run-flat tires, including a vulcanized rubber which is formed of a rubber composition containing a rubber component containing a dienic rubber, a vulcanizing agent, and a carbon black having a dibutyl phthalate oil absorption of 120 mL/100 g or more, and has a specific surface area according to a nitrogen adsorption method of 20 to 80 $m^2/g$, with a ratio of an Sx bond (where x is 3 or more) to all sulfide bonds in the side-reinforcing rubber for run-flat tires being 40% or less. The side-reinforcing rubber for run-flat tires is excellent in durability life.

16 Claims, 1 Drawing Sheet

(56) References Cited

U.S. PATENT DOCUMENTS

| | | | | |
|---|---|---|---|---|
| 2004/0173295 | A1* | 9/2004 | Zanzig | B60C 11/00 |
| | | | | 152/209.5 |
| 2006/0094831 | A1 | 5/2006 | Choi et al. | |
| 2007/0272336 | A1* | 11/2007 | Hatakeyama | B60C 17/043 |
| | | | | 152/158 |
| 2012/0152425 | A1* | 6/2012 | Kawashima | B60C 17/0009 |
| | | | | 152/517 |
| 2015/0298511 | A1 | 10/2015 | Kameda | |

FOREIGN PATENT DOCUMENTS

| | | |
|---|---|---|
| JP | 2006-143860 A | 6/2006 |
| JP | 2007-238078 A | 9/2007 |
| JP | 2008-137501 A * | 6/2008 |
| JP | 2009-024046 A | 2/2009 |
| JP | 2010-100794 A | 5/2010 |
| JP | 2010-155550 A | 7/2010 |
| JP | 2012006563 A | 1/2012 |
| JP | 2012-251021 A | 12/2012 |
| JP | 2014-088502 A | 5/2014 |
| JP | 2014-237753 A | 12/2014 |
| JP | 2016-503105 A | 2/2016 |
| WO | 2005/035647 A1 | 4/2005 |
| WO | 2016/056443 A1 | 4/2016 |
| WO | 2016/143755 A1 | 9/2016 |
| WO | 2016/143756 A1 | 9/2016 |
| WO | 2016/143757 A1 | 9/2016 |

OTHER PUBLICATIONS

Communication dated Feb. 12, 2021, from the European Patent Office in application No. 18818307.3.

* cited by examiner

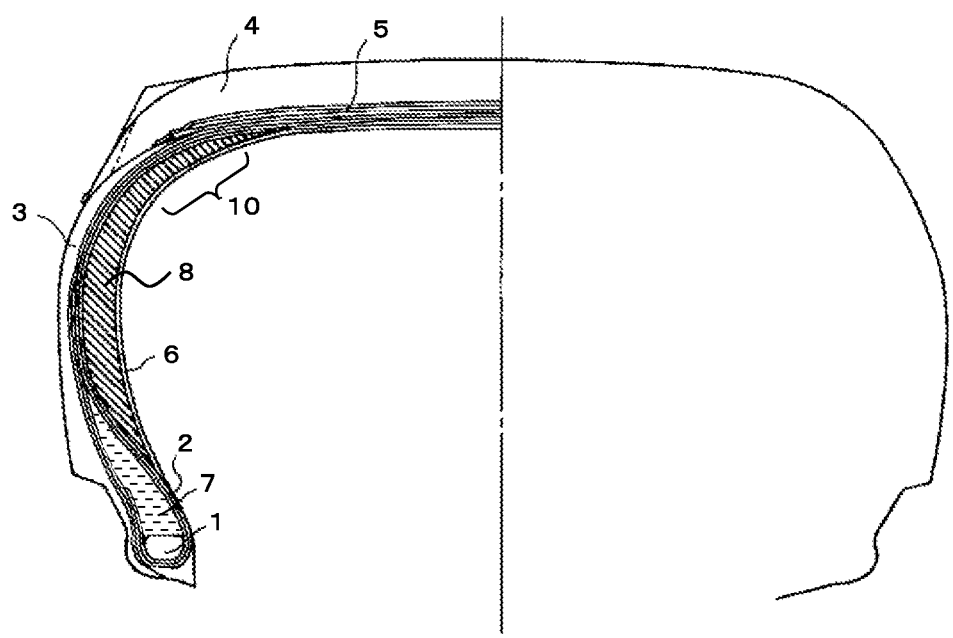

SIDE-REINFORCING RUBBER FOR RUN-FLAT TIRE AND RUN-FLAT TIRE

CROSS-REFERENCE TO RELATED APPLICATIONS

This application is a bypass continuation in part Application of PCT/JP2018/022047, which was filed on Jun. 8, 2018. This application is based upon and claims the benefit of priority to Japanese Application No. 2017-119063, which was filed on Jun. 16, 2017.

TECHNICAL FIELD

The present invention relates to a side-reinforcing rubber for run-flat tires and a run-flat tire.

BACKGROUND ART

Heretofore, in run-flat tires, a side-reinforcing layer formed of a rubber composition alone or a composite of a rubber composition and fibers is arranged for the purpose of enhancing the stiffness of the side wall part.

Regarding such run-flat tires, for example, for the purpose of enhancing the run-flat durability without detracting from the rolling resistance in ordinary running thereof, there is described a pneumatic tire equipped with a bead core, a carcass layer, a tread rubber layer, an inner liner, a side-reinforcing layer and a bead filler, for which (C) a phenolic resin and (D) a methylene donor are, as a rubber composition (Z) thereof, further mixed in a rubber composition (Y) which contains (A) a rubber component and (B) carbon black in an amount of 55 parts by mass or more relative to 100 parts by mass of the rubber component, and in which the rubber composition (Y) has such vulcanized rubber properties that the modulus of elasticity at 100% elongation (M100) is 10 MPa or more and the Σ value of the tangent loss tan δ at 28° C. to 150° C. is 6.0 or less (for example, see PTL 1).

Further, for the purpose of preventing roughness from occurring in a side wall part owing to the splice site of carcass layers even when the number of carcass layers is reduced and for thereby enabling weight reduction and productivity enhancement of tires, there is disclosed a pneumatic radial tire in which a carcass layer is formed to bridge between a pair of right and left bead cores, in which one end in the tire peripheral direction EE' of the tire and the other end are layered to form a splice site, and in which an ultra-poorly-contractile polyester cord having a total denier number of 3000 D to 8000 D is used as the cord of the carcass layer (for example, see PTL 2).

CITATION LIST

Patent Literature

PTL 1: JP 2010-155550A
PTL 2: JP 2000-301910A

However, with technical advancement in performance of vehicles, especially passenger cars, further improvement of run-flat durability is desired.

An object of the present invention is to provide a side-reinforcing rubber for run-flat tires excellent in durability life and a run-flat tire excellent in durability life.

SOLUTION TO PROBLEM

<1> A side-reinforcing rubber for run-flat tires, including a vulcanized rubber which is formed from a rubber composition containing a rubber component containing a dienic rubber, a vulcanizing agent, and a carbon black having a dibutyl phthalate oil absorption of 120 mL/100 g or more, and has a specific surface area according to a nitrogen adsorption method of 20 to 80 m$^2$/g, with a ratio of an Sx bond (where x is 3 or more) to all sulfide bonds in the side-reinforcing rubber for run-flat tires being 40% or less.

<2> The side-reinforcing rubber for run-flat tires according to <1>, wherein the rubber component contains a modified butadiene rubber.

<3> The side-reinforcing rubber for run-flat tires according to <1> or <2>, wherein the rubber composition contains a vulcanization accelerator containing a thiuram compound.

<4> The side-reinforcing rubber for run-flat tires according to <3>, wherein the thiuram compound has a side chain carbon number of 4 or more.

<5> The side-reinforcing rubber for run-flat tires according to <3> or <4>, wherein the thiuram compound contains at least tetrakis(2-ethylhexyl)thiuram disulfide.

<6> The side-reinforcing rubber for run-flat tires according to any one of <3> to <5>, wherein a ratio of the mass (a) of the vulcanization accelerator to the mass (s) of the vulcanizing agent (a/s) in the rubber composition is 1 or more.

<7> The side-reinforcing rubber for run-flat tires according to any one of <2> to <6>, wherein the modified butadiene rubber is a modified butadiene rubber having at least one functional group that interacts with carbon black.

<8> The side-reinforcing rubber for run-flat tires according to <7>, wherein the functional group that interacts with carbon black is at least one selected from the group consisting of a tin-containing functional group, a silicon-containing functional group and a nitrogen-containing functional group.

<9> The side-reinforcing rubber for run-flat tires according to any one of <1> to <8>, wherein the Sx bond ratio is 30% or less.

<10> The side-reinforcing rubber for run-flat tires according to any one of <1> to <9>, wherein the Sx bond ratio is 20% or less.

<11> The side-reinforcing rubber for run-flat tires according to any one of <1> to <10>, wherein the dibutyl phthalate oil absorption of carbon black is 130 mL/100 g or more.

<12> A run-flat tire including a side-reinforcing rubber for run-flat tires of any one of <1> to <11>.

ADVANTAGEOUS EFFECTS OF INVENTION

According to the present invention, there can be provided a side-reinforcing rubber for run-flat tires excellent in durability life and a run-flat tire excellent in durability life.

BRIEF DESCRIPTION OF DRAWING

FIG. 1 is a schematic view showing a cross section of one embodiment of a run-flat tire of the present invention.

DESCRIPTION OF EMBODIMENTS

Side-Reinforcing Rubber for Run-Flat Tires

The side-reinforcing rubber for run-flat tires of the present invention is a side-reinforcing rubber for run-flat tires, including a vulcanized rubber which is formed from a rubber composition containing a rubber component containing a dienic rubber, a vulcanizing agent, and a carbon black having a dibutyl phthalate oil absorption of 120 mL/100 g or more, and has a specific surface area according to a nitrogen adsorption method of 20 to 80 m²/g, with a ratio of an Sx bond (where x is 3 or more) to all sulfide bonds in the side-reinforcing rubber for run-flat tires being 40% or less.

The side-reinforcing rubber for run-flat tires of the present invention is preferably a rubber produced by vulcanizing the above-mentioned rubber composition, and is preferably a vulcanized rubber of the rubber composition. Hereinunder a vulcanized rubber of the rubber composition that contains a rubber component containing a dienic rubber, a vulcanizing agent, and a carbon black having a dibutyl phthalate oil absorption of 120 mL/100 g or more and having a specific surface area according to a nitrogen adsorption method of 20 to 80 m²/g may be referred to as "the vulcanized rubber of the present invention".

In the present invention, the Sx bond indicates a sulfide bond of x's sulfur atoms bonding to each other in series and, for example, an $S_1$ bond (x=1) is a monosulfide bond represented by "—S—", an $S_2$ bond (x=2) is a disulfide bond represented by "—S—S—", and an $S_3$ bond (x=3) is a trisulfide bond represented by "—S—S—S—". In this description, a sulfide bond where x is 3 or more is referred to as a "polysulfide bond". A "ratio of an Sx bond (where x is 3 or more) to all sulfide bonds", that is, a ratio of a polysulfide bond to all sulfide bonds is referred to as a "polysulfide ratio".

Regarding the sulfide bond in a side-reinforcing rubber for run-flat tires, when x is larger to be 3 or more and more, it is considered that the bond becomes weak and the cross-linked network structure that crosslinks a dienic rubber may be more readily broken, and accordingly, it is considered that by reducing the polysulfide ratio therein so as to increase the ratio of the monosulfide bond and the disulfide bond to all sulfide bonds, the network structure breakage in the side-reinforcing rubber for run-flat tires can be thereby reduced. In addition, when the polysulfide ratio is 40% or less, it is considered that the side-reinforcing rubber for run-flat tires can be excellent in heat-resistant antiaging performance and the modulus of elasticity thereof can be prevented from decreasing under high-temperature conditions.

The rubber composition that constitutes the vulcanized rubber of the present invention contains a carbon black having a dibutyl phthalate oil absorption (DBP oil absorption) of 120 mL/100 g or more and has a specific surface area according to a nitrogen adsorption method of 20 to 80 m²/g. The DBP oil absorption is used as an index that indicates a growth degree of an aggregate structure (also referred to as "structure") of carbon black, and a larger DBP oil absorption means that the aggregate tends to be larger. In this description, a carbon black having a DBP oil absorption of 120 mL/100 g or more is referred to as a high-structure carbon black. In general, a high-structure carbon black has a high-heat generation property, and therefore a run-flat tire that contains a high-structure carbon black generates much heat in running and therefore the durability life thereof tends to be shortened. However, since the rubber composition to constitute the vulcanized rubber further contains a large-size carbon black having a specific surface area according to a nitrogen adsorption method of 20 to 80 m²/g, it is considered that the vulcanized rubber can have a low-heat generation property.

As described above, it is considered that the effect of improving low-heat generation property and compression resistance owing to the specific carbon black having a DBP oil absorption of 120 mL/100 g or more and having a specific surface area according to a nitrogen adsorption method of 20 to 80 m²/g, and the effect of improving heat-resistant antiaging property owing to the specific sulfur-crosslinked structure having a polysulfide ratio of 40% act synergistically to significantly improve the life of the side-reinforcing rubber for run-flat tires that involves deformation and heat generation, while also imparting low-heat generation property thereto.

From the viewpoint of more effectively preventing the network structure of the side-reinforcing rubber for run-flat tires from being broken, the polysulfide ratio in the side-reinforcing rubber for run-flat tires is preferably 30% or less, more preferably 20% or less.

The polysulfide ratio in a side-reinforcing rubber for run-flat tires can be calculated according to the swelling compression method described in the Journal of Society of Rubber Science and Technology, Japan, Vol. 75, No. 2 (2002), page 73.

Lithium aluminum hydride (LiAlH$_4$) selectively cleaves a disulfide bond and a polysulfide bond in a vulcanized rubber but does not cleave a monosulfide bond therein. On the other hand, a 0.4 mol/L solution of propane-2-thiol and piperidine cleaves a polysulfide bond alone, and therefore based on the difference between these reagents, a proportion of each sulfide bond can be determined. A ratio of a monosulfide bond to all sulfide bonds is represented by $v_M$, a ratio of a disulfide bond to all sulfide bonds is by $v_D$, and a polysulfide ratio is by $v_P$.

A total sulfide bond amount ($v_T$) can be determined by swelling a vulcanized rubber with the same solvent but not containing a reagent.

$v_M$ and ($v_M+v_D$) can be directly measured according to the method mentioned below. $v_D$ can be calculated from ($v_M+v_D$)·$v_M$, and $v_P$ can be calculated from $v_T$·($v_M+v_D$).

First, using piperidine as a solvent, a 0.4 mol/L solution of lithium aluminum hydride, a 0.4 mol/L solution of propane-2-thiol, and a piperidine solvent of piperidine alone are prepared.

A side-reinforcing rubber for run-flat tires is sliced into thin slices (2 mm×2 mm, thickness 2 mm), and these slices are individually immersed in the lithium aluminum hydride solution, the propane-2-thiol solution and the piperidine solvent.

Next, from ($v_M+v_D$) and $v_T$, and according to the already mentioned computational expressions, $v_P$, that is, a polysulfide ratio can be calculated.

The side-reinforcing rubber for run-flat tires of the present invention preferably has a tensile modulus of elasticity at 25% elongation at 100° C. (hereinafter this may be simply referred to as "tensile modulus of elasticity") of 1.2 MPa or more. When the tensile modulus of elasticity thereof is 1.2 MPa or more, the side-reinforcing rubber can have stiffness enough to sufficiently support the load of run-flat tires as a side wall support, therefore improving the durability life of run-flat tires.

The tensile modulus of elasticity can be measured according to JIS K 6251:2017, and is preferably 1.4 MPa or more, more preferably 1.5 MPa or more.

The rubber composition to constitute the vulcanized rubber and the tire of the present invention are described in detail hereinunder.

In the present invention, "rubber component" means a polymeric substance having rubber elasticity at room temperature and is a polymer component in a rubber before vulcanization. "Rubber composition" is a mixture containing at least a rubber component and a vulcanizing agent, and one produced by vulcanizing the rubber composition is referred to as a "vulcanized rubber". Namely, a rubber component is contained in an unvulcanized rubber composition and is not in a vulcanized rubber composition.

Rubber Component

The rubber composition to constitute the vulcanized rubber of the present invention contains at least a rubber component that contains a dienic rubber.

The dienic rubber may be at least one selected from the group consisting of a natural rubber (NR) and a synthetic dienic rubber.

Specifically, the synthetic dienic rubber includes a polyisoprene rubber (IR), a polybutadiene rubber (BR), a styrene-butadiene copolymer rubber (SBR), a butadiene-isoprene copolymer rubber (BIR), a styrene-isoprene copolymer rubber (SIR), and a styrene-butadiene-isoprene copolymer rubber (SBIR).

As the dienic rubber, preferred are a natural rubber, a polyisoprene rubber, a styrene-butadiene copolymer rubber, a polybutadiene rubber, and an isobutylene-isoprene rubber, and more preferred are a natural rubber and a polybutadiene rubber. One kind alone of the dienic rubber may be used, or two or more kinds thereof may be used as blended.

For the dienic rubber, any one of a natural rubber and a synthetic diene rubber may be used, or both the two may be used, but from the viewpoint of improving rupture characteristics such as tensile strength and elongation at break, preferably, a natural rubber and a synthetic dienic rubber are used in combination. The proportion of the natural rubber in the rubber component is, from the viewpoint of more effectively improving rupture characteristics such as tensile strength and elongation at break, preferably 10% by mass or more, more preferably 20 to 80% by mass.

Within a range not detracting from the advantageous effects of the present invention, the rubber component may contain a non-dienic rubber.

From the viewpoint of improving the low-heat generation property of the side-reinforcing rubber for run-flat tires, the rubber component preferably uses a synthetic rubber containing a modifying group.

In particular, for the purpose of enhancing the interaction with carbon black, the rubber component preferably contains a modified butadiene rubber as a synthetic rubber containing a modifying group.

Preferably, the modified butadiene rubber is a modified butadiene rubber having at least one functional group capable of interacting with carbon black. The functional group that interacts with carbon black is preferably a functional group having an affinity for carbon black, and specifically, at least one selected from the group consisting of a tin-containing functional group, a silicon-containing functional group and a nitrogen-containing functional group is preferred.

In the case where the modified butadiene rubber is a modified butadiene rubber having at least one functional group selected from the group consisting of a tin-containing functional group, a silicon-containing functional group and a nitrogen-containing functional group, the modified butadiene rubber is preferably one modified with a modifying agent such as a tin-containing compound, a silicon-containing compound or a nitrogen-containing compound to thereby have a tin-containing functional group, a silicon-containing functional group or a nitrogen-containing functional group introduced thereinto.

In modifying a polymerization active site of a butadiene rubber with a modifying agent, the modifying agent to be used is preferably a nitrogen-containing compound, a silicon-containing compound and a tin-containing compound. In this case, through modification reaction, a nitrogen-containing functional group, a silicon-containing functional group or a tin-containing functional group can be introduced.

Such a functional group for modification may exist in any of a polymerization starting terminal, a main chain and a polymerization active terminal of polybutadiene.

The nitrogen-containing compound usable as the above-mentioned modifying agent preferably has a substituted or unsubstituted amino group, amide group, imino group, imidazole group, nitrile group or pyridyl group. Preferred examples of the nitrogen-containing compound as a modifying agent include isocyanate compounds such as diphenylmethane diisocyanate, crude MDI, trimethylhexamethylene diisocyanate, and tolylene diisocyanate; and 4-(dimethylamino)benzophenone, 4-(diethylamino)benzophenone, 4-dimethylaminobenzylidene-aniline, 4-dimethylaminobenzylidene-butylamine, dimethylimidazolidinone, and N-methylpyrrolidone-hexamethyleneimine.

The silicon-containing compound usable as the modifying agent includes
3-glycidoxypropyltrimethoxysilane, 3-glycidoxypropyltriethoxysilane,
N-(1-methylpropylidene)-3-(triethoxysilyl)-1-propaneamine,
N-(1,3-dimethylbutylidene)-3-(triethoxysilyl)-1-propaneamine,
N-(3-triethoxysilylpropyl)-4,5-dihydroxyimidazole,
3-methacryloyloxyropyltrimethoxysilane, 3-isocyanatopropyltriethoxysilane,
3-triethoxysilylpropylsuccinicanhydride,
3-(1-hexamethyleneimino)propyl(triethoxy)silane,
(1-hexamethyleneimino)methyl(trimethoxy)silane,
3-diethylaminopropyl(triethoxy)silane, 3-dimethylaminopropyl(triethoxy)silane,
2-(trimethoxysilylethyl)pyridine, 2-(triethoxysilylethyl)pyridine,
2-cyanoethyltriethoxysilane, and tetraethoxysilane. One kind alone these silicon-containing compounds or two or more kinds thereof may be used either singly or as combined. Partial condensates of the silicone-containing compound are also usable.

Further, as the above-mentioned modifying agent, also preferred is a modifying agent represented by the following formula (I);

$$R^1{}_a Z X_b \qquad (I)$$

wherein $R^1$ is each independently selected from an alkyl group having 1 to 20 carbon atoms, a cycloalkyl group having 3 to 20 carbon atoms, an aryl group having 6 to 20 carbon atoms, and an aralkyl group having 7 to 20 carbon atoms; Z represent tin or silicon; X each independently represents chlorine or bromine; a is 0 to 3, and b is 1 to 4, provided that a+b=4.

A modified butadiene rubber produced through modification with a modifying agent of the formula (I) contains at least one tin-carbon bond or silicon-carbon bond.

Specifically, $R^1$ in the formula (I) includes a methyl group, an ethyl group, an n-butyl group, a neophyl group, a cyclohexyl group, an n-octyl group, and a 2-ethylhexyl group. Specifically, as the modifying agent of the formula (I), preferred are $SnCl_4$, $R^1SnCl_3$, $R^1{}_2SnCl_2$, $R^1{}_3SnCl$, $SiCl_4$, $R^1SiCl_3$, $R^1{}_2SiCl_{12}$, and $R^1{}_3SiCl$, and especially preferred are $SnlC_4$ and $SiCl_4$.

Among the above, the modified butadiene rubber is, from the viewpoint of making the side-reinforcing rubber for run-flat tires have a low-heat generation property and enhancing and prolonging the durability life thereof, preferably a modified butadiene rubber having a nitrogen-containing functional group, and is more preferably an amine-modified butadiene rubber.

Also preferably, the amine-modified butadiene rubber is one having, as introduced thereinto as an amine functional group for modification, a primary amino group protected with an eliminable group or a secondary amino group protected with an eliminable group, and is more preferably one having, as introduced thereinto, a silicon atom-containing functional group.

Examples of the primary amino group protected with an eliminable group (also referred to as a protected primary amino group) include an N,N-bis(trimethylsilyl)amino group. Examples of the secondary amino group protected with an eliminable group include an N,N-(trimethylsilyl) alkylamino group. The N,N-(trimethylsilyl)alkylamino group may be any of an acyclic residue and a cyclic residue.

Among the above-mentioned amine-modified butadiene rubber, more preferred is a primary amine-modified butadiene rubber that is modified with a protected primary amino group.

The silicon atom-containing functional group includes a hydrocarbyloxysilyl group in which a hydrocarbyloxy group and/or a hydroxy group bonds to the silicon atom, and/or a silanol group.

Such a functional group for modification has an amino group protected with an eliminable group, and one or more (for example, one or two) silicon atoms to which a hydrocarbyloxy group and a hydroxy group bond, preferably at the polymerization terminal of a butadiene rubber, more preferably at the same polymerization active terminal thereof.

For modifying the active terminal of a butadiene rubber by reacting it with a protected primary amine, preferably, at least 10% polymer chains in the butadiene rubber have a living property or a pseudo-living property. Such a living polymerization reaction includes an anionic polymerization reaction of a conjugated diene compound alone or a conjugated diene compound and an aromatic vinyl compound in an organic solvent using an organic alkali metal compound as an initiator, and a coordinate anionic polymerization reaction of a conjugated diene compound alone or a conjugated diene compound and an aromatic vinyl compound in the presence of a catalyst containing a lanthanum series rare earth element compound in an organic solvent. The former is preferred since, as compared with that in the latter, one having a higher vinyl bond content in the conjugated diene moiety can be produced in the former. By increasing the vinyl bond content therein, the heat resistance of the resultant polymer can be improved.

The organic alkali metal compound usable as an initiator for anionic polymerization is preferably an organic lithium compound. Though not specifically limited thereto, a hydrocarbyl lithium and a lithium amide compound are preferably used as the organic lithium compound, and in the case where the former hydrocarbyl lithium is used, a butadiene rubber which has a hydrocarbyl group at the polymerization starting terminal and in which the other terminal is a polymerization active site is produced. In the case where the latter lithium amide compound is used, a butadiene rubber which has a nitrogen-containing group at the polymerization starting terminal and in which the other terminal is a polymerization active site is produced.

The hydrocarbyl lithium is preferably one having a hydrocarbyl group with 2 to 20 carbon atoms, and examples thereof include ethyl lithium, n-propyl lithium, isopropyl lithium, n-butyl lithium, sec-butyl lithium, tert-octyl lithium, n-decyl lithium, phenyl lithium, 2-naphthyl lithium, 2-butylphenyl lithium, 4-phenylbutyl lithium, cyclohexyl lithium, cyclopentyl lithium, and a reaction product of diisopropenylbenzene and butyl lithium, and among these, in particular, n-butyl lithium is preferred.

On the other hand, examples of the lithium amide compound include lithium hexamethyleneimide, lithium pyrrolidide, lithium piperidide, lithium heptamethyleneimide, lithium dodecamethyleneimide, lithium dimethylamide, lithium diethylamide, lithium dibutylamide, lithium dipropylamide, lithium diheptylamide, lithium dihexylamide, lithium dioctylamide, lithium di-2-ethylhexylamide, lithium didecylamide, lithium N-methylpiperazide, lithium ethylpropylamide, lithium ethylbutylamide, lithium ethylbenzylamide, and lithium methylphenethylamide. Among these, from the viewpoint of the interaction effect with carbon black and the polymerization initiation performance thereof, preferred are cyclic lithium amides such as lithium hexamethyleneimide, lithium pyrrolidide, lithium pip eridide, lithium heptamethyleneimide, and lithium dodecamethyleneimide, and especially preferred are lithium hexamethyleneimide and lithium pyrrolidide.

Regarding these lithium amide compounds, in general, those previously prepared from a secondary amine and a lithium compound can be used for polymerization, but such compounds can be prepared in a polymerization system (in-situ). The amount of the polymerization initiator to be used is preferably selected within a range of 0.2 to 20 mmol per 100 g of monomer.

The method of producing a butadiene rubber according to anionic polymerization using the above-mentioned lithium compound as a polymerization initiator is not specifically limited, for which any conventionally-known method is employable.

Specifically, in an organic solvent inert to reaction, for example, in a hydrocarbon solvent such as an aliphatic, alicyclic or aromatic hydrocarbon compound, a conjugated diene compound, or a conjugated diene compound and an aromatic vinyl compound may be polymerized in a mode of anionic polymerization using the above-mentioned lithium compound as a polymerization initiator and optionally in the presence of a randomizer to give an intended butadiene rubber having an active terminal.

In the case where an organic lithium compound is used as a polymerization initiator, not only a butadiene compound having an active terminal but also a copolymer of a conjugated diene compound and an aromatic vinyl compound having an active terminal can also be produced efficiently, as compared with a case using a catalyst containing the above-mentioned lanthanum rare earth element compound.

The hydrocarbon solvent is preferably one having 3 to 8 carbon atoms, and examples thereof include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, and ethylbenzene. One alone of these may be used singly, or two or more thereof may be used as combined.

The monomer concentration in the solvent is preferably 5 to 50% by mass, more preferably 10 to 30% by mass. In the case where conjugated diene compound and an aromatic vinyl compound are copolymerized, the content of the aromatic vinyl compound in the prepared monomer mixture is preferably within a range of 55% by mass or less.

Modifying Agent

In the present invention, as described above, the active terminal of a butadiene rubber having an active terminal as prepared in the manner as above is reacted with a protected primary amine compound as a modifying agent to give a primary amine-modified butadiene rubber, but when reacted with a protected secondary amine compound, a secondary amine-modified butadiene is produced. The protected primary amine compound is preferably an alkoxysilane compound having a protected primary amino group, and the protected secondary amine compound is preferably an alkoxysilane compound having a protected secondary amino group.

Examples of the alkoxysilane compound having a protected primary amino group that is used as a modifying agent for obtaining the above-mentioned amine-modified butadiene rubber include
N,N-bis(trimethylsilyl)aminopropylmethyldimethoxysilane,
1-trimethylsilyl-2,2-dimethoxy-1-aza-2-silacyclopentane,
N,N-bis(trimethylsilyl)aminopropyltrimethoxysilane,
N,N-bis(trimethylsilyl)aminopropyltriethoxysilane,
N,N-bis(trimethylsilyl)aminopropyldiethoxysilane,
N,N-bis(trimethylsilyl)aminoethyltrimethoxysilane,
N,N-bis(trimethylsilyl)aminoethyltriethoxysilane,
N,N-bis(trimethylsilyl)aminoethylmethyldimethoxysilane and
N,N-bis(trimethylsilyl)aminoethylmethyldiethoxysilane.
Preferred are
N,N-bis(trimethylsilyl)aminopropylmethyldimethoxysilane,
N,N-bis(trimethylsilyl)aminopropylmethyldiethoxysilane and
1-trimethylsilyl-2,2-dimethoxy-1-aza-2-silacyclopentane.

The modifying agent for obtaining the above-mentioned amine-modified butadiene rubber also includes an alkoxysilane compound having a protected secondary amino group such as
N-methyl-N-trimethylsilylaminopropyl(methyl)dimethoxysilane,
N-methyl-N-trimethylsilylaminopropyl(methyl)diethoxysilane,
N-trimethylsilyl(hexamethyleneimin-2-yl)propyl(methyl) dimethoxysilane,
N-trimethylsilyl(hexamethyleneimin-2-yl)propyl(methyl) diethoxysilane,
N-trimethylsilyl(pyrrolidine-2-yl)propyl(methyl)dimethoxysilane,
N-trimethylsilyl(pyrrolidine-2-yl)propyl(methyl)diethoxysilane,
N-trimethylsilyl(piperidine-2-yl)propyl(methyl)dimethoxysilane,
N-trimethylsilyl(piperidine-2-yl)Propyl(methyl)diethoxysilane,
N-trimethylsilyl(imidazol-2-yl)propyl(methyl)dimethoxysilane,
N-trimethylsilyl(imidazol-2-yl)propyl(methyl)diethoxysilane,
N-trimethylsilyl(4,5-dihydroimidazol-5-yl)propyl(methyl) dimethoxysilane, and
N-trimethylsilyl(4,5-dihydroimidazol-5-yl)propyl(methyl) diethoxysilane; an alkoxysilane compound having an imino group such as
N-(1,3-dimethylbutylidene)-3-(triethoxysilyl)-1-propaneamine,
N-(1-methylethylidene)-3-(triethoxysilyl)-1-propaneamine,
N-ethylidene-3-(triethoxysilyl)-1-propaneamine,
N-(1-methylpropylidene)-3-(triethoxysilyl)-1-propaneamine,
N-(4-N,N-dimethylaminobenzylidene)-3-(triethoxysilyl)-1-propanamine, and
N-(cyclohexylidene)-3-(triethoxysilyl)-1-propaneamine;
and an alkoxysilane compound having an amino group such as
3-dimethylaminop ropyl(triethoxy)silane,
3-dimethylaminop ropyl(trimethoxy)silane, 3-diethylaminop ropyl(triethoxy)silane,
3-diethylaminopropyl(trimethoxy)silane, 2-dimethylaminoethyl(triethoxy)silane,
2-dimethylaminoethyl(triethoxy)silane,
3-dimethylaminop ropyl(diethoxy)methylsilane, and
3-dibutylaminop rop yl(triethoxy)silane.

One alone of these modifying agents may be used singly or two or more kinds thereof may be used as combined. The modifying agent may be a partial condensate.

Here, the partial condensate means a modifying agent where a part (but not all) of SiOR (R is an alkyl group or the like) is condensed in the form of an SiOSi bond.

In the modification reaction with the modifying agent, the amount of the modifying agent to be used is preferably 0.5 to 200 mmol/kg×butadiene rubber mass. The "amount to be used is A to B mmol/kg×butadiene rubber mass" means that the amount to be used is within a range of A (mmol/kg)× butadiene rubber mass to B (mmol/kg)×butadiene rubber mass. The same shall apply to the meaning of the amount to be used. The amount to be used is preferably 1 to 100 mmol/kg×butadiene rubber mass, more preferably 2 to 50 mmol/kg×butadiene rubber mass. Here, the butadiene rubber mass means a mass of the butadiene rubber not containing any additive such as an antioxidant added during production or after production. By controlling the amount of the modifying agent used to fall within the above-mentioned range, a side-reinforcing rubber for run-flat tires excellent in dispersibility of filler especially carbon black therein and having improved rupture resistance property and low-heat generation property can be obtained.

A method for adding the modifying agent is not specifically limited, and may include a method of adding it all at a time, a method of adding it divided in portions, and a method of adding it continuously, but a method of adding it all at a time is preferred.

The modifying agent may be bonded not only to the polymerization starting terminal and the polymerization ending terminal but also to any of the polymer main chain and the side chain, but is, from the viewpoint of preventing energy dissipation from the polymer terminal to improve the low-heat generation property of the resultant polymer, preferably introduced into the polymerization starting terminal or the polymerization ending terminal.

Condensation Accelerator

In the present invention, preferably, a condensation accelerator is used for accelerating the condensation reaction that the protected primary amino group-having alkoxysilane used as a modifying agent participates in.

As such a condensation accelerator, usable is a compound having a tertiary amino group, or an organic compound having one or more elements belonging to any of Group 3, Group 4, Group 5, Group 12, Group 13, Group 14 and Group 15 of the Periodic Table (long-form). Further, as such a condensation accelerator, preferred are alkoxides, carboxylates or acetylacetonate complex salts containing at least one or more metals selected from the group consisting of titanium (Ti), zirconium (Zr), bismuth (Bi), aluminum (Al) and tin (Sn).

Here, the condensation accelerator may be added before modification reaction, but is preferably added to the modification reaction system during and/or after modification reaction. In the case where the condensation accelerator is added before modification reaction, direction reaction may occur at the active terminal so that a protected primary amino group-having hydrocarbyloxy group could not be introduced into the active terminal.

The time of adding the condensation accelerator is generally in 5 minutes to 5 hours after the start of modification reaction, preferably in 15 minutes to 1 hour after the start of modification reaction.

Specifically, examples of the condensation accelerator include titanium-containing compounds such as tetramethoxy titanium, tetraethoxy titanium, tetra-n-propoxy titanium, tetraisopropoxy titanium, tetra-n-butoxy titanium, tetra-n-butoxy titanium oligomer, tetra-sec-butoxy titanium, tetra-tert-butoxy titanium, tetra(2-ethylhexyl) titanium, bis(octanedioleate)-bis(2-ethylhexyl) titanium, tetra(octanedioleate) titanium, titanium lactate, titanium dipropoxy-bis(triethanolaminate), titanium dibutoxy-bis(triethanolaminate), titanium tributoxy stearate, titanium triisopropoxy stearate, titanium ethylhexyl dioleate, titanium tripropoxyacetyl acetonate, titanium dip rop oxy-bis(acetylacetonate), titanium triisopropoxyethyl acetoacetate, titanium propoxyacetylacetonate-bis(ethylacetoacetate), titanium tributoxy acetylacetonate, titanium dibutoxy-bis(acetylacetonate), titanium tributoxyethyl acetoacetate, titanium butoxyacetylacetonate-bis(ethylacetoacetate), titanium tetrakis(acetylacetonate), titanium diacetylacetonate-bis(ethylacetoacetate), bis(2-ethylhexanoate) titanium oxide, bis(laurate) titanium oxide, bis(naphthenate) titanium oxide, bis(stearate) titanium oxide, bis(oleate) titanium oxide, bis(linoleate) titanium oxide, tetrakis(2-ethylhexanoate) titanium, tetrakis(laurate) titanium, tetrakis(naphthenate) titanium, tetrakis(stearate) titanium, tetrakis(oleate) titanium, tetrakis(linoleate) titanium, tetrakis(2-ethyl-1,3-hexanedioleate) titanium.

In addition, as examples, there are also mentioned bismuth or zirconium-containing compounds such as tris(2-ethylhexanoate) bismuth, tris(laurate) bismuth, tris(naphthenate) bismuth, tris(stearate) bismuth, tris(oleate) bismuth, tris(linoleate) bismuth, tetraethoxy zirconium, tetra-n-propoxy zirconium, tetraisopropoxy zirconium, tetra-n-butoxy zirconium, tetra-sec-butoxy zirconium, tetra-tert-butoxy zirconium, tetra(2-ethylhexyl) zirconium, zirconium tributoxystearate, zirconium tributoxyacetylacetonate, zirconium dibutoxybis(acetylacetonate), zirconium tributoxyethylacetoacetate, zirconium butoxyacetylacetonate-bis(ethylacetoacetate), zirconium tetrakis(acetylacetonate), zirconium diacetylacetonate-bis(ethyl acetoacetate), bis(2-ethylhexanoate) zirconium oxide, bis(laurate) zirconium oxide, bis(naphthenate)zirconium oxide, bis(stearate) zirconium oxide, bis(oleate) zirconium oxide, bis(linoleate) zirconium oxide, tetrakis(2-ethylhexanoate) zirconium, tetrakis(laurate) zirconium, tetrakis(nap hthenate) zirconium, tetrakis(stearate) zirconium, tetrakis(oleate)zirconium, and tetrakis(linoleate) zirconium.

In addition, as examples, there are also mentioned aluminum-containing compounds such as triethoxy aluminum, tri-n-propoxy aluminum, triisopropoxy aluminum, tri-n-butoxy aluminum, tri-sec-butoxy aluminum, tri-tert-butoxy aluminum, tri(2-1-ethylhexyl)aluminum, aluminum dibutoxystearate, aluminum dibutoxyacetylacetonate, aluminum butoxy-bis(acetylacetonate), aluminum dibutoxyethylacetoacetate, aluminum tris(acetylacetonate), aluminum tris(ethylacetoacetate), tris(2-ethylhexanoate) aluminum, tris (laurate) aluminum, tris(naphthenate) aluminum, tris (stearate) aluminum, tris(oleate) aluminum, and tris (linoleate) aluminum.

Among the above-mentioned condensation accelerators, titanium compounds are preferred, and titanium metal alkoxides, titanium metal carboxylates, or titanium metal acetylacetonate complex salts are especially preferred.

The amount of the condensation accelerator to be used is, as a molar ratio of the molar number of the compound to the total amount of the hydrocarbyloxy group existing in the reaction system, preferably 0.1 to 10, more preferably 0.5 to 5. When the amount of the condensation accelerator falls within the above-mentioned range, condensation reaction can go on efficiently.

The condensation reaction time is generally 5 minutes to 10 hours, preferably 15 minutes to 5 hours or so. When the condensation reaction time falls within the range, condensation reaction can finish smoothly.

The pressure in the reaction system in condensation reaction is generally 0.01 to 20 MPa, preferably 0.05 to 10 MPa.

The content of the modified rubber in the rubber composition is preferably 10 to 90% by mass, more preferably 20 to 80% by mass.

Filler

The rubber composition to constitute the vulcanized rubber of the present invention contains at least a carbon black having a dibutyl phthalate oil absorption of 110 mL/100 g or more and having a specific surface area according to a nitrogen adsorption method of 20 to 80 $m^2/g$. For increasing the stiffness of the side-reinforcing rubber for run-flat tires, the composition may further contain a reinforcing filler such as a carbon black not having the above-mentioned characteristics or silica.

Using a high-structure carbon black having a DBP oil absorption of 120 mL/100 g or more, the rubber composition can give a side-reinforcing rubber for run-flat tires excellent in compression resistance. The DBP oil absorption of the carbon black is preferably 130 mL/100 g or more, more preferably 160 mL/100 g or more.

The carbon black has a nitrogen specific surface area of 20 to 80 $m^2/g$. Using the carbon black having a nitrogen specific surface area that falls within the range, the side-reinforcing rubber for run-flat tires can be excellent in the balance between reinforcing performance and low hysteresis loss. The nitrogen specific surface area of the carbon black is preferably 60 $m^2/g$ or less.

The high-structure carbon black having a large particle size as mentioned above can be used as a damping rubber material such as typically vibration absorbing rubber and seismic isolation rubber, but vibration absorbing rubber is a soft rubber acting so as not transfer the vibration of a car engine to the inside of a car. As opposed to this, the side-reinforcing rubber for run-flat tires of the present invention is a reinforcing member that support car bodies in running even under high-compression conditions and high-temperature conditions, and and is therefore greatly different from a damping rubber material in point of the service environment and the object thereof. A vibration absorbing rubber can be considered to be a member that supports an engine load, but quite differs from a side-reinforcing rubber in that the side-reinforcing rubber receives a force under severe conditions within a short period of time from a car running at a high speed, while the vibration absorbing rubber keeps receiving a force for a long period of time from an engine under relatively mild conditions.

The content of carbon black in the rubber composition is, from the viewpoint of the balance between reinforcing performance and low hysteresis loss of the side-reinforcing rubber for run-flat tires of the present invention, preferably 30 to 100 parts by mass relative to 100 parts by mass of the rubber component therein, more preferably 35 to 80 parts by mass, even more preferably 40 to 70 parts by mass.

Vulcanizing Agent, Vulcanization Accelerator

The rubber composition contains a vulcanizing agent. As the vulcanizing agent, in general, sulfur is used.

Preferably, the rubber composition contains a vulcanization accelerator for accelerating vulcanization of the rubber component therein, and especially for readily controlling the polysulfide ratio in the resultant side-reinforcing rubber for run-flat tires to be 30% or less, the rubber composition is preferably vulcanized according to a known method of an EV (efficient vulcanization) system or a semi-EV system. From such viewpoint, the vulcanization accelerator preferably contains a thiuram compound.

The thiuram compound preferably has a side chain carbon number of 4 or more, more preferably 6 or more, even more preferably 8 or more. When the side chain carbon number is 4 or more, the thiuram compound can excellently disperse in the rubber composition to facilitate constitution of a uniform crosslinked network structure.

Examples of the thiuram compound having 4 or more side chain carbon atoms include tetrakis(2-ethylhexyl)thiuram disulfide, tetrakis(n-dodecyl)thiuram disulfide, tetrakis(benzyl)thiuram disulfide, tetrabutylthiuram disulfide, dipentamethylenethiuram tetrasulfide, and tetrabenzylthiuram disulfide. Above all, tetrakis(2-ethylhexyl)thiuram disulfide is preferred.

Preferably, the vulcanization accelerator is used in a mass amount equivalent to or more than the mass of the vulcanizing agent (e.g., sulfur) used, and more preferably in an amount of two times or more of the mass of the vulcanizing agent. Namely, with respect to the rubber composition, the ratio of the mass (a) of the vulcanization accelerator to the mass (s) of the vulcanizing agent (a/s) is preferably 1 or more, more preferably 2 or more. The ratio (a/s) may be 100 or less.

Since the vulcanization accelerator has a higher polarity than that of the rubber component, the vulcanization accelerator may precipitate out from the surface of the rubber component (blooming phenomenon). In order that the vulcanized rubber can have a predetermined modulus of elasticity, a large amount of the vulcanization accelerator is desired to be added, but by controlling the ratio (a/s) to be 100 or less, the blooming phenomenon can be prevented, therefore retarding adhesion failure in working and preventing final products from having a poor appearance. From such viewpoints, the ratio (a/s) is preferably 10 or less.

Also preferably, the content of the vulcanization accelerator in the rubber composition is 2 to 30 parts by mass relative to 100 parts by mass of the rubber component therein, more preferably 4 to 20 parts by mass.

For attaining a desired vulcanization torque and a desired vulcanization speed, any other vulcanization accelerator and vulcanization retardant than a thiuram compound can be used as combined.

The rubber composition to constitute the vulcanized rubber of the present invention preferably has a Mooney viscosity ($ML_{1+4}$, at 130° C.) of 40 to 100, more preferably 50 to 90, even more preferably 60 to 85. When the Mooney viscosity falls within the above-mentioned range, the vulcanized rubber can have sufficient properties for side-reinforcing rubber for run-flat tires including rupture resistance without detracting from processability.

The rubber composition to constitute the vulcanized rubber of the present invention can contain, along with the above-mentioned components, any additives that are mixed and used in ordinary rubber compositions. For example, various additives that are generally mixed in ordinary rubber compositions are usable, including various fillers except carbon black and silica (e.g., clay, calcium carbonate), a silane coupling agent, a vulcanization acceleration aid, a vulcanization retardant, a softener such as various process oils, zinc oxide, stearic acid, wax, an antiaging agent, a compatibilizer, a processability improver, a lubricant, a tackifier, a petroleum resin, a UV absorbent, a dispersant, and a homogenizer.

As an antiaging agent, any known one is usable with no specific limitation, and examples thereof include a phenol-based antiaging agent, an imidazole-based antiaging agent, and an amine-based antiaging agent. The amount of the antiaging agent to be added is generally 0.5 to 10 parts by mass relative to 100 parts by mass of the rubber component, preferably 1 to 5 parts by mass.

In obtaining the rubber composition, a method of mixing the above-mentioned components is not specifically limited, and all the component raw materials may be mixed and kneaded all at a time, or the components may be divided into portions and mixed and kneaded in two stages or three stages. In kneading them, a kneading machine such as a roll, an internal mixer, or a Banbury mixer can be used. Further, in the case where the composition is shaped into sheets or strips, any known molding machine such as an extrusion molding machine or a pressing machine may be used.

Tire, Run-Flat Tire

The run-flat tire of the present invention includes the vulcanized rubber of the present invention as a side-reinforcing rubber.

Hereinunder, an example of a structure of a run-flat tire having a side-reinforcing rubber layer is described with reference to FIG. 1.

FIG. 1 is a schematic view showing a cross section of one embodiment of a run-flat tire of the present invention, and describes a configuration of each member such as a side-reinforcing rubber layer 8 to constitute a run-flat tire of the present invention.

In FIG. 1, a preferred embodiment of the side-reinforcing rubber for run-flat tires of the present invention (hereinafter sometimes referred to as "tire" simply) is a tire that includes a carcass layer 2 formed of at least one radial carcass ply that toroidally runs between a pair of bead cores 1 and 1' (1' is not shown) in such a manner that each end thereof rolls up the bead core 1 from the inner side of the tire to the outer side thereof; a side rubber layer 3 arranged outside in the tire axial direction in the side region of the carcass layer 2 to form an outside part; a tread rubber layer 4 arranged outside the tire radial direction in the crown region of the carcass layer 2 to form a tread part; a belt layer 5 arranged between the tread rubber layer 4 and the crown region of the carcass layer 2 to form a reinforcing belt; an inner liner 6 arranged allover in the inner surface of the tire of the carcass layer 2; a bead filler 7 arranged between the body part of the carcass layer 2 extending from one bead core 1 to the other bead core 1' and the winding part to wind up the bead core 1; and at least one side-reinforcing rubber layer 8 whose cross-sectional shape along the tire rotation axis is nearly a crescent shape, between the carcass layer 2 and the inner liner 6 from the side part of the bead filler 7 in the side region of the carcass layer 2 to the shoulder region 10.

The run-flat tire of the present invention including the side-reinforcing rubber for run-flat tires of the present invention as the side-reinforcing rubber layer 8 is excellent in durability life.

The carcass layer 2 of the tire of the present invention is formed of at least one carcass ply, but may have 2 or more carcass plies. A reinforcing cord of the carcass ply may be arranged at an angle of substantially 90° to the tire peripheral direction, and the number of the reinforcing cords to be driven in may be 35 to 65 cords/50 mm. The belt layer 5 composed of two layers of a first belt layer 5a and a second belt layer 5b are arranged outside the tire radial direction in the crown region of the carcass layer 2, but the number of the belt layers 5 is not limited thereto. For the first belt layer 5a and the second belt layer 5b, plural steel cords that are, without twisted, aligned in parallel to each other in the tire width direction may be buried in rubber, and for example, the first belt layer 5a and the second belt layer 5b may be so arranged as to cross with each other between the layers to form crossed belts.

Further, a belt-reinforcing layer (not shown) may be arranged outside in the tire radial direction of the belt layer 5. The reinforcing cord of the belt-reinforcing layer is preferably a cord of organic fibers having high elasticity, since the purpose thereof is to secure the tensile stiffness in the tire peripheral direction. The organic fiber cord may be those of organic fibers of an aromatic polyamide (aramid), polyethylene naphthalate (PEN), polyethylene terephthalate, rayon, Zylon (registered trademark) (polyparaphenylene benzobisoxazole (PBO) fibers), an aliphatic polyamide (nylon), etc.

Further, with respect to the tire, any other reinforcing members such as an insert or a flipper may be arranged, though not shown, in addition to the side-reinforcing layer. Here, an insert means a reinforcing material formed of plural high-elasticity organic fiber cords aligned and coated with rubber, which is arranged in a tire peripheral direction from a bead part to a side part (not shown). A flipper means a reinforcing material formed of plural high-elasticity organic fiber cords aligned and coated with rubber, which is arranged between a body part extending between the bead core 1 or 1' and a folded part as folded around the bead core 1 or 1' and which envelops at least a part of the bead core 1 or 1' and the bead filler 7 arranged outside in the tire radial direction thereof. The angle of the insert and the flipper is preferably 30 to 60° to the peripheral direction.

In the pair of bead parts, the bead cores 1 and 1' are buried, and the carcass layer 2 is locked as folded from inside to outside the tire around the bead cores 1 and 1, but the locking method for the carcass layer 2 is not limited thereto. For example, at least one carcass ply of the carcass plies constituting the carcass layer 2 may be folded from inside toward outside in the tire width direction around the bead cores 1, 1', and the folded end may be a so-called envelop structure that is positioned between the belt layer 5 and the crown part of the carcass layer 2. Also further, a tread pattern may be appropriately formed on the surface of the tread rubber layer 4, and the inner liner 6 may be formed on the innermost layer. In the tire of the present invention, the gas to be filled therein may be ordinary air or air having a changed oxygen partial pressure, or may also be an inert gas such as nitrogen.

Production of Tire

The run-flat tire of the present invention can be produced according to a production method for ordinary run-flat tires, except that the side-reinforcing rubber for run-flat tires of the present invention is used for the side-reinforcing rubber layer 8.

Specifically, in a stage where the rubber composition containing various chemicals is unvulcanized, the rubber composition is worked into various members, and are stuck and molded according to an ordinary method on a tire molding machine to give a green tire. The green tire is pressed under heat in a vulcanizing machine to give a run-flat tire.

EXAMPLES

Examples 1 to 3, Comparative Examples 1 to 5

Preparation of Rubber Composition

Constituent components are kneaded in a formulation shown in Table 1 below to prepare rubber composition.

The modified butadiene rubber used in preparing rubber compositions is produced according to the following method.

Production of Primary Amine-Modified Butadiene Rubber P (1) Production of Unmodified Polybutadiene Under nitrogen, a cyclohexane solution of 1.4 kg of cyclohexane, 250 g of 1,3-butadiene and 2,2-ditetrahydrofurylpropane (0.285 mmol) is injected into a nitrogen-purged 5-L autoclave, and 2.85 mmol of n-butyl lithium (BuLi) is added thereto and subjected to polymerization for 4.5 hours in a hot water bath set at 50° C. and equipped with a stirrer. The reaction conversion of 1,3-butadiene is almost 100%. A part of the polymer solution is taken out and put into a methanol solution containing 1.3 g of 2,6-di-tert-butyl-p-cresol to stop the polymerization, then the solvent is removed by steam stripping, and the residue is dried with a roll at 110° C. to give an unmodified polybutadiene. The resultant unmodified polybutadiene is analyzed for the microstructure (vinyl bond amount), resulting in that the vinyl bond amount is 30% by mass.

(2) Production of Primary Amine-Modified Polybutadiene Rubber P

The polymer solution obtained in the above (1) is, without deactivating the polymerization catalyst, kept at a temperature 50° C., and 1129 mg (3.364 mmol) of N,N-bis(trimethylsilyl)aminopropylmethyldiethoxysilane in which the primary amino group is protected was added thereto to attain modification for 15 minutes.

Subsequently, 8.11 g of a condensation accelerator tetrakis(2-ethyl-1,3-hexanedioleate) titanium is added and further stirred for 15 minutes.

Finally, after the reaction, 242 mg of a metal halide compound silicon tetrachloride is added to the polymer solution and 2,6-di-tert-butyl-p-cresol is added. Next, the solvent is removed by steam stripping, and the protected primary amino group is deprotected, and the rubber is dried with a hot roll controlled at 110° C. to give a primary amine-modified polybutadiene rubber P.

The resultant modified polybutadiene is analyzed for the microstructure (vinyl bond amount), resulting in that the vinyl bond amount is 30% by mass.

The primary amino group content (mmol/kg) of the primary amine-modified butadiene rubber P is determined as follows.

First, the polymer is dissolved in toluene, and precipitated in a large amount of methanol to thereby separate the amino group-containing compound not bonding to the polymer from the rubber, and then dried. A sample of the thus-processed polymer is analyzed according to "Testing Method for Total Amine Values" described in JIS K7237: 1995 to quantify the total amino group content therein. Subsequently, a sample of the processed polymer is analyzed according to "Acetylacetone Blocked Method" to quantify the content of the secondary amino group and the tertiary amino group therein. As the solvent to dissolve the sample, o-nitrotoluene is used, and acetylacetone is added to carry out potentiometric titration with a perchloric acid-acetic acid solution. By subtracting the content of secondary amino group and the tertiary amino group from the total amino group content, the primary amino group content (mmol) is determined, and this is divided by the mass of the polymer used for analysis to give a primary amino group content (mmol/kg) bonding to the polymer.

Details of the other components than the modified butadiene rubber (primary amine-modified polybutadiene rubber P) used in preparing the rubber composition are as mentioned below.

Natural rubber (NR): RSS #1
Carbon black 1: available from Asahi Carbon Co., Ltd., "Asahi #65"
[nitrogen adsorption method specific surface area 42 m$^2$/g, DBP oil absorption 120 mL/100 g]
Carbon black 2: available from Asahi Carbon Co., Ltd., "Asahi #60HN"
[nitrogen adsorption method specific surface area 48 m$^2$/g, DBP oil absorption 130 mL/100 g]
Carbon black 3: available from Asahi Carbon Co., Ltd., "Asahi #60"
[nitrogen adsorption method specific surface area 40 m$^2$/g, DBP oil absorption 114 mL/100 g]
Carbon black 4: available from Asahi Carbon Co., Ltd., "Asahi F200"
[nitrogen adsorption method specific surface area 51 m$^2$/g, DBP oil absorption 180 mL/100 g]
DCPD resin: dicyclopentadiene petroleum resin, available from Zeon Corporation, "Quinton 1105"
Stearic acid: available from New Japan Chemical Co., Ltd., "Stearic Acid 50S"
Zinc oxide: available from Hakusui Tech., "No. 3 Zinc Oxide"
Antiaging agent (6C): N-phenyl-N'-(1,3-dimethylbutyl)-p-phenylenediamine, available from Ouchi Shinko Chemical Industrial Co., Ltd., "Nocrac 6C"
Vulcanization accelerator 1 (CZ): N-cyclohexyl-2-benzothiazolyl sulfenamide, available from Ouchi Shinko Chemical Industrial Co., Ltd., "Nocceler CZ-G"
Vulcanization accelerator 2 (DZ): N,N'-dicyclohexyl-2-benzothiazyl sulfenamide, available from Ouchi Shinko Chemical Industrial Co., Ltd., "Nocceler DZ"
Vulcanization accelerator 3 (TOT): tetrakis(2-ethylhexyl) thiuram disulfide, available from Ouchi Shinko Chemical Industrial Co., Ltd., "Nocceler TOT-N"
Sulfur: available from Tsurumi Chemical Industry Co., Ltd., "Powder Sulfur"

Production of Run-flat Tire, Physical Properties Measurement and Evaluation of Side-reinforcing Rubber Next, the resultant rubber composition is set as the side-reinforcing rubber layer 8 shown in FIG. 1, and radial run-flat tires for passenger cars having a tire size of 205/65 R16 in an usual manner. The maximum thickness of the side-reinforcing rubber layer of the tire is 6.0 mm.

For the produced run-flat tire, physical properties of the side-reinforcing rubber, that is, the polysulfide ratio and the tensile modulus of elasticity at 25% elongation at 100° C. thereof are measured, and as tire performance, the run-flat running distance is evaluated. The results are shown in Table 1.

1. Polysulfide Ratio

For the polysulfide ratio ($v_P$) in the side-reinforcing rubber, ($v_M$+$v_D$) and $v_T$ are measured according to the previously-described swelling compression method, and the value is calculated from a calculating formula "$v_T-(v_M+v_D)$".

2. Tensile Modulus of Elasticity at 25% Elongation at 100° C.

Based on JIS K 6251:2017, the side-reinforcing rubber is worked into a test piece of dumbbell No. 8, and the tensile modulus of elasticity at 100% elongation thereof is measured at a measurement temperature 25° C.

3. Run-Flat Running Distance

The tire is made to run on a drum (speed 80 km/h) in an internal pressure unfilled state, and the drum running distance until the tire can not more run is referred to as a run-flat running distance. The run-flat running distance of the run-flat tire of Comparative Example 1 is expressed as an index, 100. A larger index indicates that the durability life of the run-flat tire is better.

TABLE 1

| Rubber Composition (part by mass) | Comparative Example 1 | Comparative Example 2 | Comparative Example 3 | Example 1 | Example 2 | Comparative Example 4 | Example 3 | Comparative Example 5 |
|---|---|---|---|---|---|---|---|---|
| Natural rubber | 60 | 60 | 60 | 60 | 60 | 60 | 60 | 60 |
| Modified butadiene rubber | 40 | 40 | 40 | 40 | 40 | 40 | 40 | 40 |
| Carbon black 1 (Asahi #65) | 50 | — | — | 50 | — | — | — | — |
| Carbon black 2 (Asahi #60HN) | — | 50 | — | — | 50 | — | — | — |
| Carbon black 3 (Asahi #60) | — | — | 50 | — | — | 50 | — | — |
| Carbon black 4 (Asahi #F200) | — | — | — | — | — | — | 50 | 50 |
| DCPD resin | 3 | 3 | 3 | 3 | 3 | 3 | 3 | 3 |

TABLE 1-continued

| Rubber Composition (part by mass) | Comparative Example 1 | Comparative Example 2 | Comparative Example 3 | Example 1 | Example 2 | Comparative Example 4 | Example 3 | Comparative Example 5 |
|---|---|---|---|---|---|---|---|---|
| Stearic acid | 1 | 1 | 1 | 1 | 1 | 1 | 1 | 1 |
| Zinc oxide | 5 | 5 | 5 | 5 | 5 | 5 | 5 | 5 |
| Antiaging agent (6C) | 3 | 3 | 3 | 3 | 3 | 3 | 3 | 3 |
| Vulcanization accelerator 1 (CZ) | — | — | — | 3.75 | 3.75 | 3.75 | 3.75 | — |
| Vulcanization accelerator 2 (DZ) | 3.75 | 3.75 | 3.75 | — | — | — | — | 3.75 |
| Vulcanization accelerator 3 (TOT) | — | — | — | 7.5 | 7.5 | 7.5 | 7.5 | — |
| Sulfur | 7.5 | 7.5 | 7.5 | 3.75 | 3.75 | 3.75 | 3.75 | 7.5 |
| Polysulfide ratio | 82% | 84% | 81% | 18% | 16% | 18% | 17% | 79% |
| Tensile modulus of elasticity (M25, 100° C.) [MPa] | 1.5 | 1.6 | 1.5 | 1.6 | 1.6 | 1.5 | 1.8 | 1.7 |
| Run-flat running distance (index) | 100 | 104 | 98 | 126 | 131 | 106 | 155 | 107 |

From Table 1, it is known that the run-flat tires of Examples 1 to 3 including the side-reinforcing rubber for run-flat tires having a polysulfide ratio (Sx bond ratio where x is 3 or more) of less than 30% and a tensile modulus of elasticity at 25% elongation at 100° C. of 1.2 MPa or more have a larger run-flat running distance (index) than the run-flat tires of Comparative Examples 1 to 5.

Comparative Example 4 is a vulcanized rubber similar to the vulcanized rubber shown in PTL 1 [vulcanized rubber of a rubber composition containing natural rubber/amine-modified BR=30/70, carbon black having a DBP oil absorption of 114 mL/100 g and a nitrogen adsorption method specific surface area of 40 m²/g, and an accelerator TOT].

From such evaluation results, it is known that the side-reinforcing rubbers for run-flat tires of Examples 1 to 3 and the run-flat tires produced using these have a long durability life.

INDUSTRIAL APPLICABILITY

The side-reinforcing rubber for run-flat tires of the present invention is excellent in durability life, and is therefore favorably used for run-flat tires.

REFERENCE SIGNS LIST

1 Bead Core
2 Carcass Layer
3 Side Rubber Layer
4 Tread Rubber Layer
5 Belt Layer
6 Inner Liner
7 Bead Filler
8 Side-Reinforcing Rubber Layer
10 Shoulder Region

The invention claimed is:

1. A side-reinforcing rubber for run-flat tires, comprising a vulcanized rubber which is formed from a rubber composition comprising a rubber component containing a dienic rubber, a vulcanizing agent, and a carbon black having a dibutyl phthalate oil absorption of 120 mL/100 g or more, and has a specific surface area according to a nitrogen adsorption method of 20 to 80 m²/g, with a ratio of an Sx bond (where x is 3 or more) to all sulfide bonds in the side-reinforcing rubber for run-flat tires being 40% or less, wherein the rubber composition comprises a vulcanization accelerator, a ratio of the mass (a) of the vulcanization accelerator to the mass (s) of the vulcanizing agent (a/s) in the rubber composition is 1 or more, and a range of the content of a vulcanization accelerator in the rubber composition is 4 to 20 parts by mass relative to 100 parts by mass of the rubber component therein, and wherein the vulcanization accelerator contains a thiuram compound.

2. The side-reinforcing rubber for run-flat tires according to claim 1, wherein the rubber component contains a modified butadiene rubber.

3. The side-reinforcing rubber for run-flat tires according to claim 1, wherein the thiuram compound has a side chain carbon number of 4 or more.

4. The side-reinforcing rubber for run-flat tires according to claim 1, wherein the thiuram compound contains at least tetrakis(2-ethylhexyl)thiuram disulfide.

5. The side-reinforcing rubber for run-flat tires according to claim 2, wherein the modified butadiene rubber is a modified butadiene rubber having at least one functional group that interacts with carbon black.

6. The side-reinforcing rubber for run-flat tires according to claim 5, wherein the functional group that interacts with carbon black is at least one selected from the group consisting of a tin-containing functional group, a silicon-containing functional group and a nitrogen-containing functional group.

7. The side-reinforcing rubber for run-flat tires according to claim 1, wherein the Sx bond ratio is 30% or less.

8. The side-reinforcing rubber for run-flat tires according to claim 1, wherein the Sx bond ratio is 20% or less.

9. The side-reinforcing rubber for run-flat tires according to claim 1, wherein the dibutyl phthalate oil absorption of carbon black is 130 mL/100 g or more.

10. A run-flat tire comprising the side-reinforcing rubber for run-flat tires of claim 1.

11. The side-reinforcing rubber for run-flat tires according to claim 2, wherein the Sx bond ratio is 30% or less.

12. The side-reinforcing rubber for run-flat tires according to claim 2, wherein the Sx bond ratio is 20% or less.

13. The side-reinforcing rubber for run-flat tires according to claim 2, wherein the dibutyl phthalate oil absorption of carbon black is 130 mL/100 g or more.

14. A run-flat tire comprising the side-reinforcing rubber for run-flat tires of claim 2.

15. The side-reinforcing rubber for run-flat tires according to claim 1, wherein the rubber composition comprises the vulcanization accelerator in an amount of 11.25 to 20 parts by mass relative to 100 parts by mass of the rubber component therein.

16. The side-reinforcing rubber for run-flat tires according to claim 1, wherein the rubber composition comprises a DCPD resin.

* * * * *